US012157573B2

(12) United States Patent
Iacobucci

(10) Patent No.: US 12,157,573 B2
(45) Date of Patent: Dec. 3, 2024

(54) COMPACTOR DEVICE FOR AERONAUTICAL USE

(71) Applicant: Iacobucci HF Aerospace S.p.A., Ferentino (IT)

(72) Inventor: Lucio Iacobucci, Ferentino (IT)

(*) Notice: Subject to any disclaimer, the term of this patent is extended or adjusted under 35 U.S.C. 154(b) by 75 days.

(21) Appl. No.: 17/904,580

(22) PCT Filed: Feb. 23, 2021

(86) PCT No.: PCT/IB2021/051505
§ 371 (c)(1),
(2) Date: Aug. 18, 2022

(87) PCT Pub. No.: WO2021/171171
PCT Pub. Date: Sep. 2, 2021

(65) Prior Publication Data
US 2023/0088812 A1    Mar. 23, 2023

(30) Foreign Application Priority Data
Feb. 25, 2020    (IT) ........................ 102020000003838

(51) Int. Cl.
*B65F 1/14*        (2006.01)
*B30B 9/30*        (2006.01)
*B64D 11/00*       (2006.01)

(52) U.S. Cl.
CPC ........ *B64D 11/0007* (2013.01); *B30B 9/3042* (2013.01); *B65F 1/1405* (2013.01); *B62B 2202/67* (2013.01)

(58) Field of Classification Search
CPC ... B65F 1/1405; B64D 11/0007; B64D 11/00; B62B 2202/67; B30B 9/3032; B30B 9/3042; B30B 9/3046
See application file for complete search history.

(56) References Cited

U.S. PATENT DOCUMENTS

| 3,772,984 | A | 11/1973 | Karls |
| 4,005,648 | A | 2/1977 | Edwards |
| 4,552,061 | A | 11/1985 | Brutsman |
| 5,517,907 | A | 5/1996 | Fox |
| 6,367,377 | B1 * | 4/2002 | Gawley ............... B30B 9/306 100/229 A |
| 2005/0061167 | A1 * | 3/2005 | Fox ..................... B30B 9/3032 100/215 |
| 2011/0259215 | A1 | 10/2011 | Doaran |
| 2019/0241268 | A1 * | 8/2019 | Iacobucci ............. B65F 1/1405 |

FOREIGN PATENT DOCUMENTS

| FR | 2184227 | 12/1973 |
| WO | 9203279 | 3/1992 |

* cited by examiner

*Primary Examiner* — Jimmy T Nguyen
(74) *Attorney, Agent, or Firm* — Themis Law

(57) ABSTRACT

A compactor trolley for aeronautical applications, more particularly a trolley, includes a flap for direct access to the waste storage compartment and a safety locking mechanism for the flap.

13 Claims, 7 Drawing Sheets

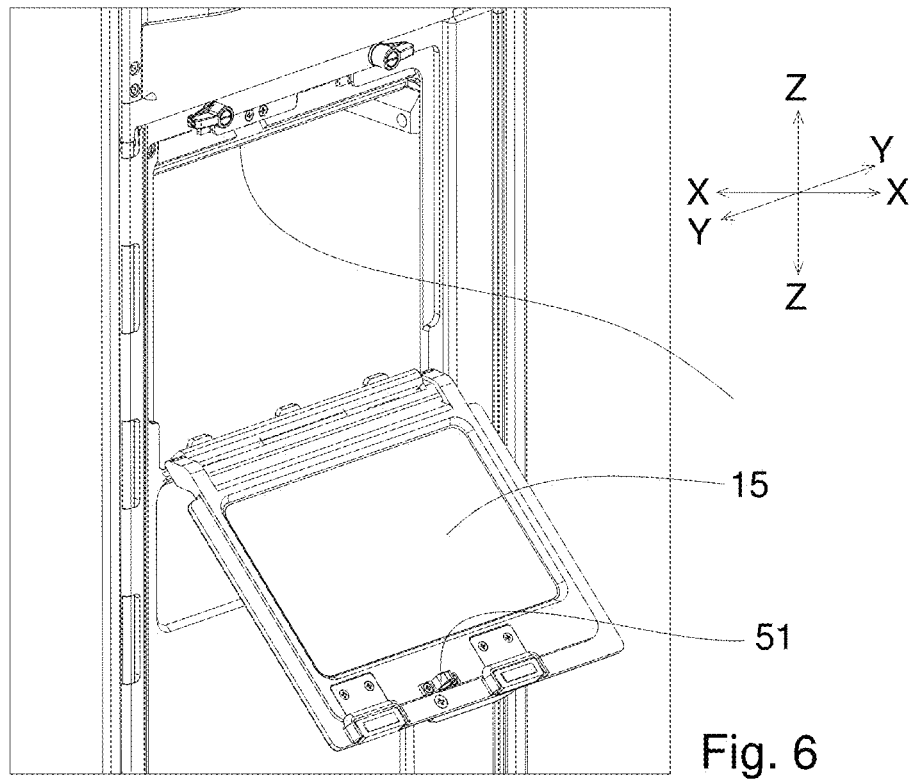
Fig. 6
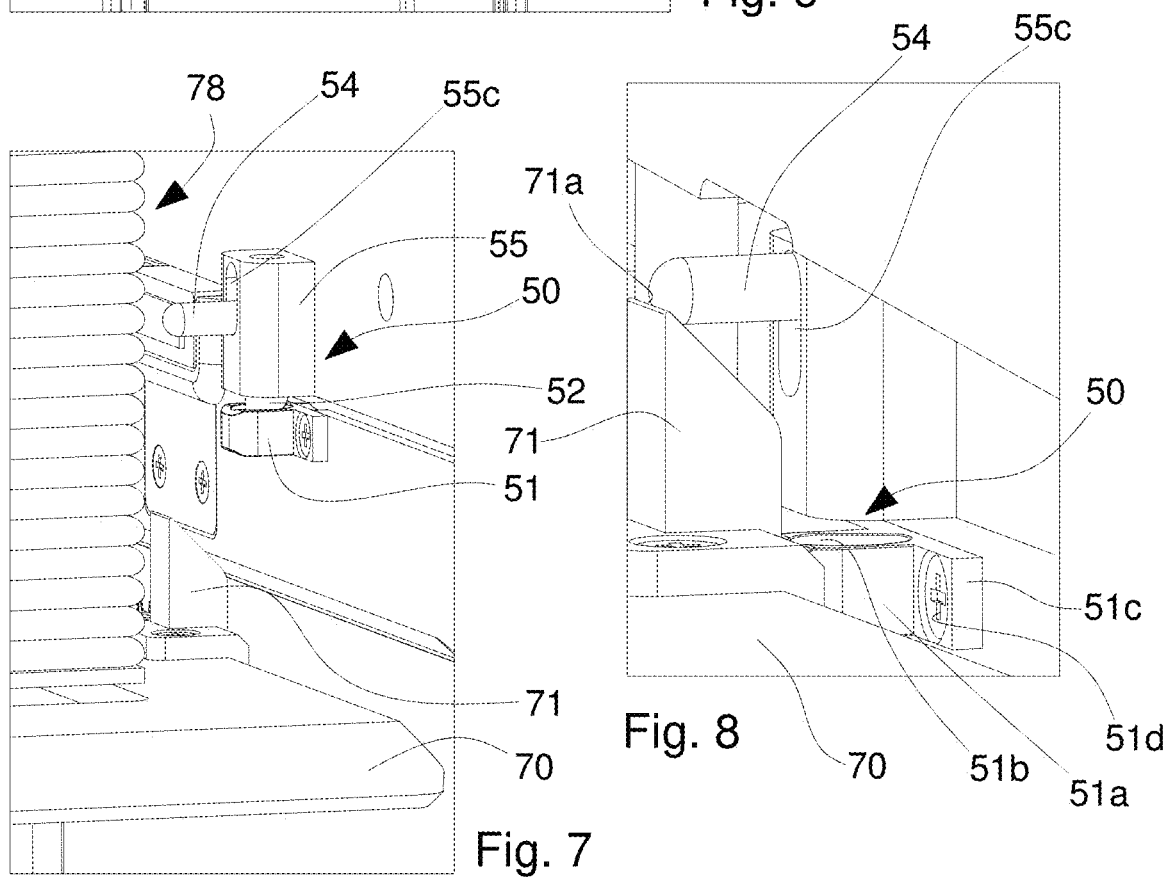
Fig. 7
Fig. 8

COMPACTOR DEVICE FOR AERONAUTICAL USE

FIELD OF THE INVENTION

The present invention relates to a compactor trolley for aeronautical applications, more particularly a trolley provided with a flap for direct access to the waste storage compartment, a compaction chamber and a safety locking mechanism for the flap.

PRIOR ART

In view of the particularly strict safety standards stipulated in the aviation sector with regard to the closing systems fitted to panels, doors and shutters, the present invention aims to solve the problems associated with the use of trolleys for the efficient collection of waste inside an aircraft.

Furthermore the aeronautical sector is also characterized by very stringent technical and weight-related requirements with regard to the materials which may be used in this sector. A high mechanical strength and impact resistance, low toxicity and low inflammability are some of the characteristics which are required, although these are properties associated with materials which have a high specific weight, such as metals. The use of materials with a high specific weight in the aeronautical sector, however, reduces the load capacity of the aircraft and it is therefore one of the most important variables to be taken into consideration when choosing materials for the construction of parts and devices for aeronautical use.

The present invention is in particular applicable to the compactor trolleys comprising a door for access to a waste compaction chamber, which door comprises a flap which can be opened and closed so as to provide access to the compaction compartment.

Said compaction chamber is generally formed by a drawer comprising said door which includes the flap and is designed to house a waste storage box inside the compaction chamber so that, once the drawer and the trolley structure are engaged with each other, the box is located in a position underneath the compactor device.

A preferred example of such a compactor trolley is known from WO2018069802A1 in the name of the same present Applicant, the teachings of which relating to the general structure of the trolley, the waste storage boxes, the control systems and user interface, the safety and detection systems as well as the characteristics of the drawer and its engagement with the trolley structure are incorporated herein by way of reference.

One problem which the present inventors have encountered with these compactor trolleys is the unsatisfactory level of safety thereof, in particular with regard to the compaction operations.

In fact the known trolleys have flap closing systems arranged on the outside of the trolley and able to be operated manually by a user. With such a configuration the closure of the compaction chamber during the compaction operations is not ensured, nor does it prevent accidental opening of the flap nor an incorrect positioning of the manual closing systems.

FR 2,184,227 A5 describes a compactor trolley with a bolt-type safety locking mechanism. One problem of such a trolley of the prior art is that the locking mechanism is housed inside the compaction chamber and operated directly by the compaction plate so that it is exposed to soiling by the waste being compacted, tending to become filled with material and therefore losing its functionality. Continuous cleaning of the plate and the locking mechanism, which is unreliable and mechanically delicate, as well as the need for continuous maintenance, are therefore fundamental.

The present invention proposes a compactor trolley which solves the aforementioned problems, being safe and easy to use and suitable therefore for being used in the aeronautical sector.

One particular object of the present invention is to provide a compactor trolley which ensures safety during the compaction operations, being reliable and easy to maintain.

In connection with this problem, it is also required that this solution should have small dimensions, be easy and inexpensive to produce and assemble and be able to be easily installed, in particular within the confined spaces present in the aeronautical sector.

SUMMARY OF THE INVENTION

The present invention therefore relates to a compactor trolley which has a parallelepiped structure, in particular suitable for being housed in a galley, comprises a compactor device as described herein.

Owing to the arrangement, above the plate, of an operating part of the actuating block which acts on the safety locking mechanism, better cleaning of the locking system is ensured so that it is reliable over a long period of time without the need for particular cleaning maintenance thereof.

The present invention relates furthermore to a method for the compaction of waste.

Preferred embodiments of the compactor trolley are described in the dependent clams, which are referred to here in their entirety.

The trolley may also be provided with wheels for moving it and/or an extractable drawer. Said extractable drawer may form the compaction chamber designed to contain a waste storage box which can be accessed from the front and from above for collection of the waste.

The front of the extractable drawer, opposite the front compaction compartment and the corresponding box on which the compaction plate of the compactor device may act, is provided with an opening, referred to below also as a flap, which provides access to the waste storage compartment, said waste storage compartment being accessible also from above when the drawer is extracted, even only partially.

The extractable drawer may also be divided into two compartments by means of a dividing wall and each of the two compartments may house a waste storage box.

Further objects will become clear from the detailed description of the invention below, with reference to preferred embodiments, it being understood however that variations are possible without departing from the scope of protection defined by the accompanying claims and with reference to the figures in the accompanying drawings.

BRIEF DESCRIPTION OF THE FIGURES

FIG. 6 shows a perspective, partial, front view of an example of a compactor trolley according to the invention, with the flap open;

FIG. 7 is a perspective schematic view of a detail of the inside of a trolley according to the invention, with the compaction plate lowered and flap safety locking system in the position for locking the flap;

FIG. 8 shows in schematic form a partial perspective view of the flap safety locking system in the position for release of the flap;

Figure 1:
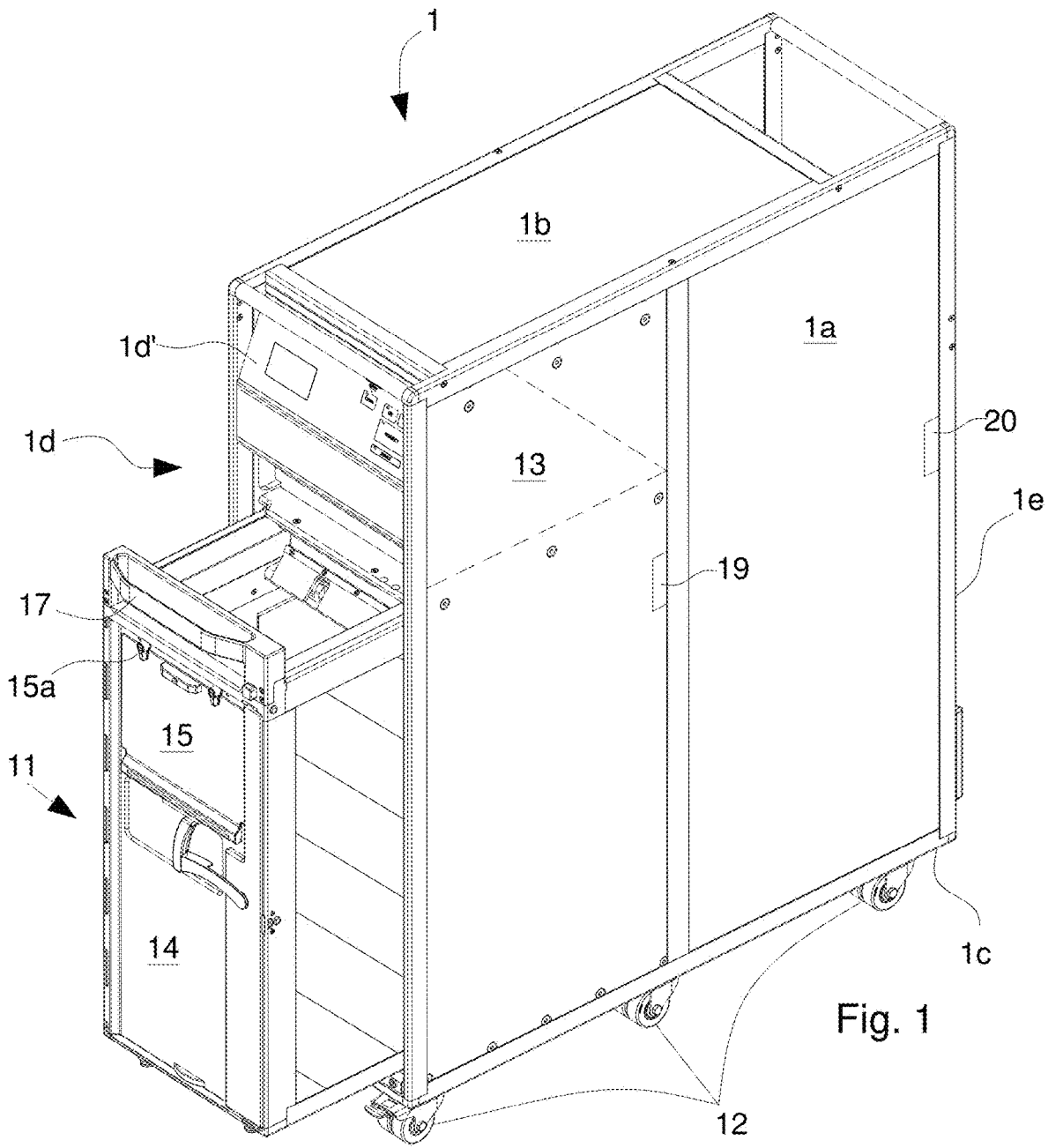
FIG. 1 is a perspective view from above of an example of a compactor trolley with door provided with a flap and partially extracted drawer.

With reference to the attached FIGS. 1 to 5, these show a preferred embodiment of an example of a compactor trolley 1 to which a safety locking mechanism according to the present invention is applicable, as will be described below.

The compactor trolley 1 for collection and compaction of the waste has a substantially parallelepiped form and comprises a rigid structure with side walls 1a, which are situated opposite each other in a transverse widthwise direction (Y-Y), a top wall 1b and a bottom wall 1c, which are situated opposite each other in a vertical heightwise direction (Z-Z), and two other walls: a front end wall 1d and rear end wall 1e, which are situated opposite each other in a longitudinal depthwise direction (X-X).

The compactor trolley 1 is preferably provided with wheels 12 for moving it, which allow the movable collection and compaction of the waste.

The trolley 1 is provided internally with a compactor device positioned at the front, in the top zone 13 of the trolley. A control panel may be provided in the top part 1d' of the front wall 1d.

The compactor trolley 1 further comprises an extractable drawer 11 with a first chamber and optionally a second chamber, the first chamber being a compaction chamber which houses a box 16 for collection and compaction of the waste, the second chamber, when present, being able to house waste storage boxes which are empty or full of compacted and uncompacted waste.

The waste storage box 16 is open at the top 16a and, partially, on one of its sides 16b, which during use is the front side. The top opening allows loading of the waste from above and compaction thereof by means of the compactor device which is present inside the trolley 1 and arranged above the compaction chamber and therefore the box. The partial side (front) opening 16b is arranged at the front with respect to the extractable drawer 11.

The compactor trolley may be of the full-size type provided both with the first chamber and with the second chamber, while in the half-size version it will have only the first chamber, namely only the compaction chamber.

The extractable drawer 11 is provided at the front with a door 14 for insertion/extraction of the waste storage boxes 16. The door 14 has a flap 15 formed therein, said flap being located opposite the side opening 16b of the waste storage box 16 so as to provide access from the outside to the waste storage box 16 and therefore to the first chamber or compaction chamber.

The drawer 11 is also provided laterally with movable walls provided with lever locking/release systems. These movable walls, when present, can be opened and may be formed on one side or both sides of the drawer 11; they have the function, once the waste has been compacted inside the box 16, of favouring easier removal of the box 16 which otherwise would risk remaining trapped owing to the pushing force exerted laterally by the said waste, once it is compressed/compacted in order to reduce its volume.

The drawer 11 is also provided at the front with a handle 17, or other similar device, for partial or total extraction from the rigid structure of the trolley 1. By means of the operation of partial extraction of the drawer 11 from the trolley 1 by means of the handle 17 an operator is able to access the open top portion 16a of the waste storage box 16, so that the waste may be also thrown in the said drawer from above, as well as from the front.

The open top portion 16a of the waste storage box 16 also allows the downward movement in the vertical direction of a compaction plate of the compactor device, for performing compaction of the waste inside the box 16.

The drawer 11 which houses the boxes 16 of waste of the compactor may also be completely extracted from the compactor trolley 1, favouring for example the possibility of performing cleaning without the need to remove the whole compactor from the aircraft (or in any case from the place where it is installed). Preferably, the trolley is provided with a mechanical system designed to make it completely extractable and/or to secure it to the trolley structure, a preferred example of embodiment of which is described in the publication WO2018069802A1 incorporated herein by way of reference.

The compactor trolley 1 may be advantageously provided with fixed safety contacts 19, 20, for example of the mechanical disengaging type, for checking the correct position of the drawer 11 for the purposes of correct operation of the compactor.

For the purposes of the present invention it is not necessary that the compaction chamber should be in the form of an extractable drawer, it being conceivable that it may be simply a chamber defined by the parallelepiped structure of the trolley 1, accessible via the flap 15 and optionally via the door 14 and/or the side walls.

The flap 15, housed inside a corresponding open recess of the door 14, may be made so as to be hinged at the top, bottom or laterally in said open recess and may be able to be opened towards the inside or outside of the trolley 1 with opening through an angle for example of between 20° and 180°. The flap 15 may also be provided with external safety closing systems, for example of the latch type 15a.

Figure 2:
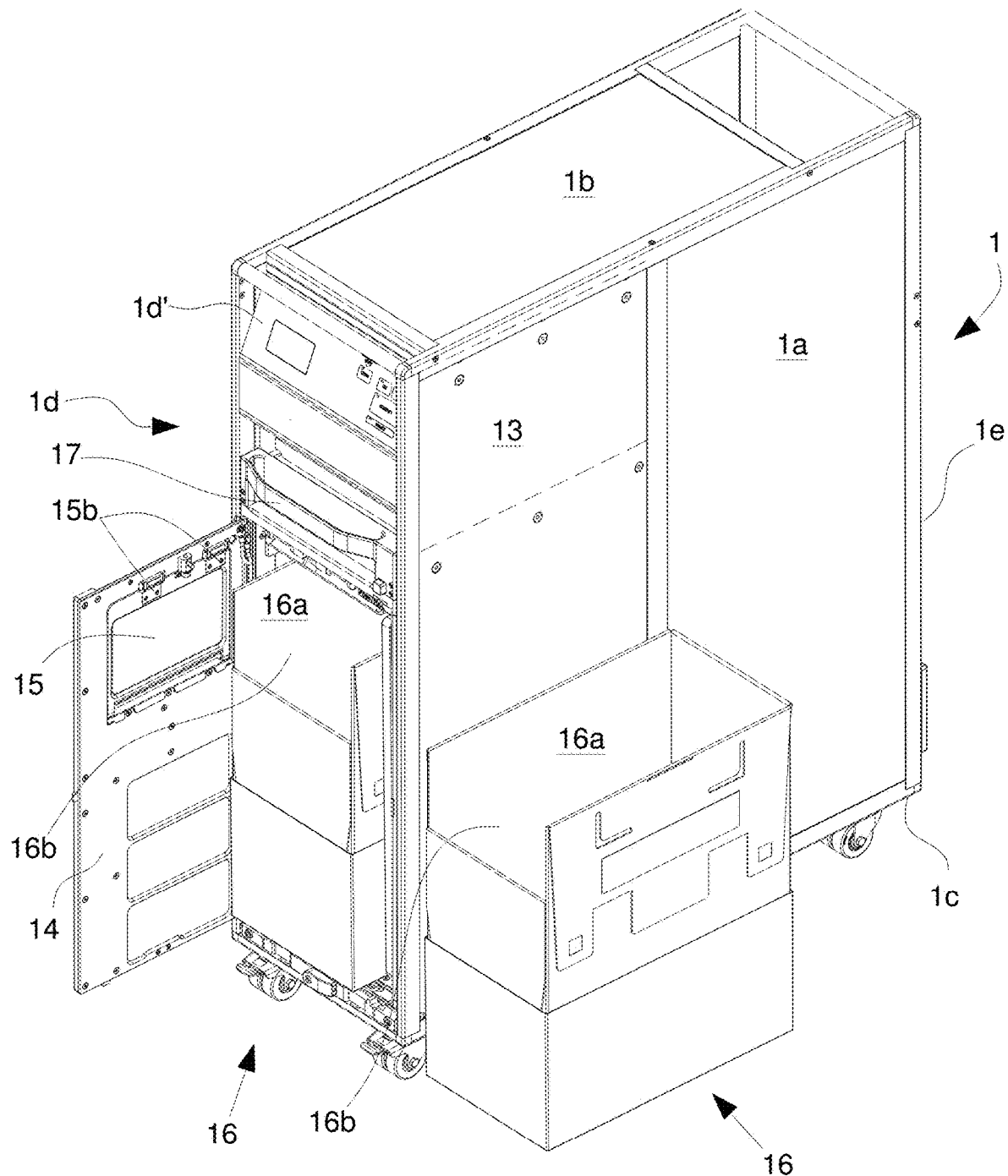
FIG. 2 is the same view as FIG. 1 with the drawer fully inserted the trolley, the door open and a waste storage box partially extracted.
Figure 3:
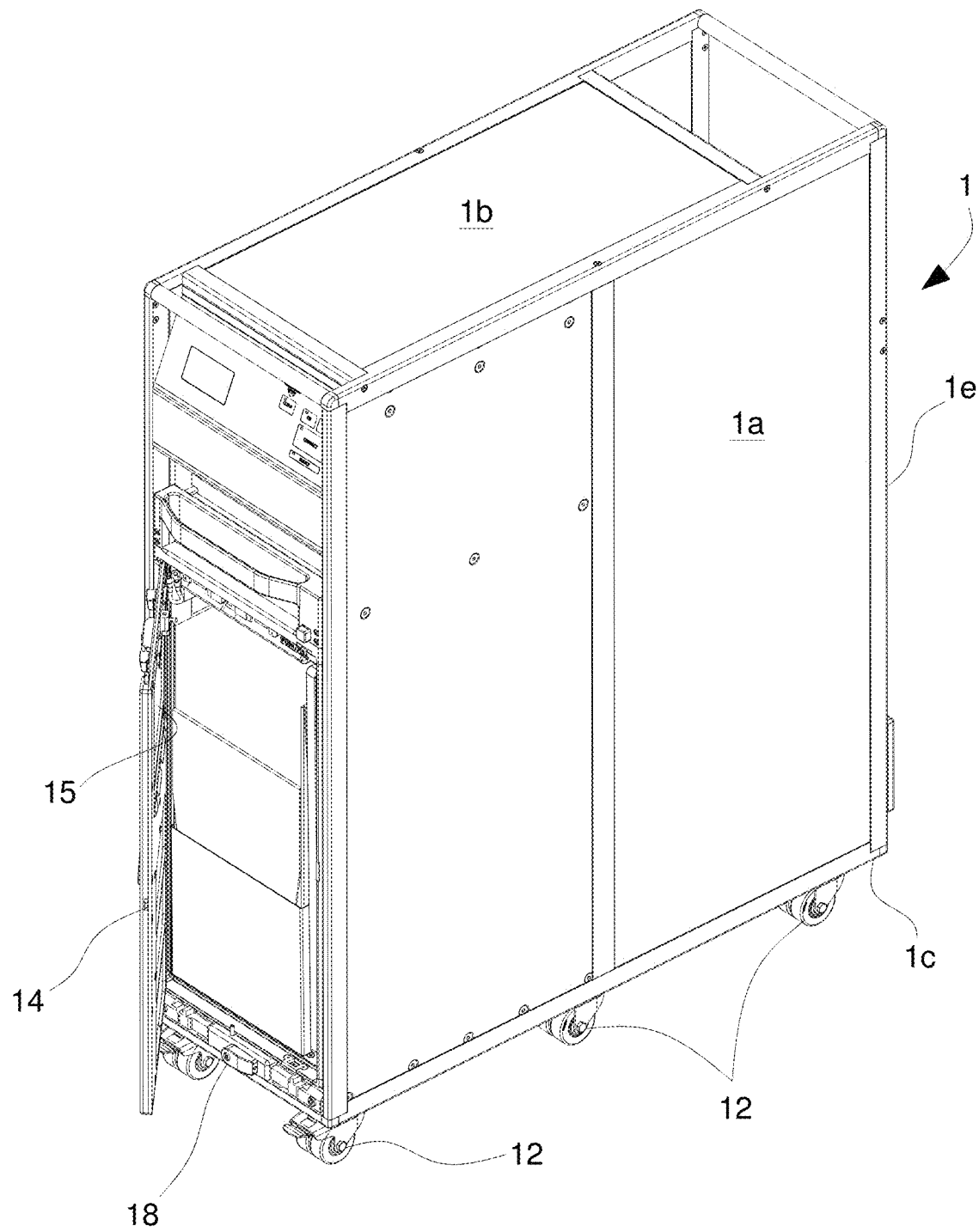
FIG. 3 is the same view as FIG. 2 with the drawer fully inserted the trolley, the door open and the waste storage box fully inserted inside the drawer.

The flap 15 may be provided with sensors 15b of the magnetic, electromechanical, optical, inductive and similar type, as shown in FIG. 2, so as to ensure that the compaction operations are performed in safety by the user.

The door 14 may also be provided with external safety closing systems 18, for example of the latch type.

The operating principle of the compactor trolley is now described.

Figure 4:
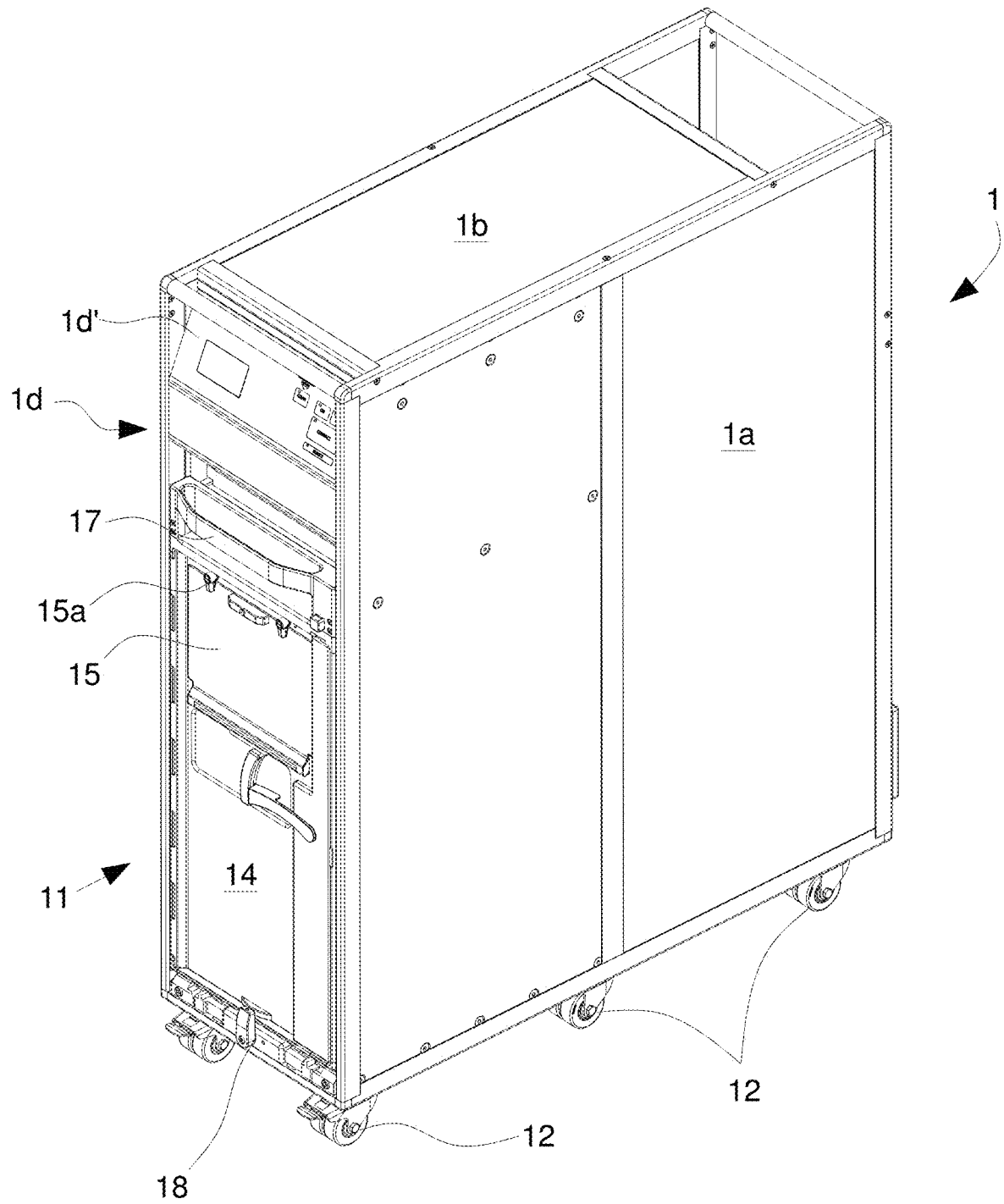
FIG. 4 is the same view as FIG. 3 with the door closed and the flap for access to the box also closed.
Figure 5:
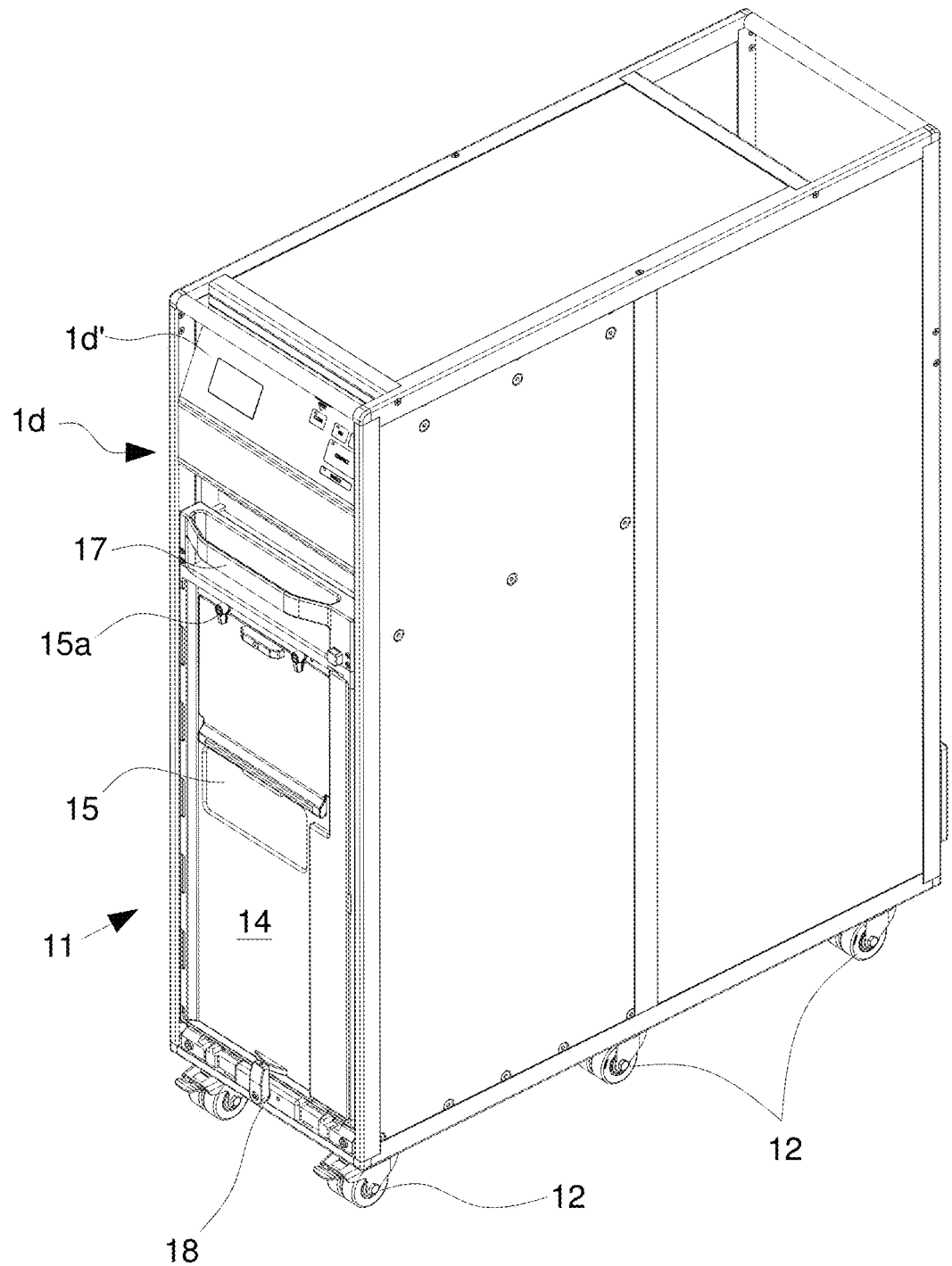
FIG. 5 shows the same view as FIG. 4 with the flap for access to the box open.

Starting with the trolley 1 in the condition shown in FIG. 4, the user opens the door 14 by operating the associated handle and inserts the box 16, optionally operating the latch 18, if necessary. Once the door 14 is closed, the compactor 1 is ready for operation. When there is rubbish which needs to be thrown away, the user has the following possibilities:

1) Waste Disposal from Above

Pull out using the handle 17 the drawer 11, which is released by means of the associated button/actuator.

Throw the waste into the box 16 from above through the opening 16*a*.

Close the drawer 11 again. At this point the user presses the button on the front panel (zone 1*d'*) and activates the compactor device for the compaction operation and, if all the operational/safety conditions are satisfied, i.e.:

the door 14 is closed;
the flap 15 is closed;
the drawer 11 is fully inserted inside the compactor trolley 1 and the fixed safety contacts 19 and 20 are in contact with each other;
the box 16 is present;
the space inside the box is not used up (signalled on the display present on 1*d'*);
the dividing wall optionally movable between the first and second compaction chambers of the drawer 11 is closed (only in the full-size version);
the electromechanical compaction actuator is operated so that it presses against the rubbish and compacts it.

2) Waste Disposal from the Front

Open the flap 15 after releasing it by operating the safety latches, throw the waste into the opening which is created (zone 16*b* of the box), close the flap 15 again, re-engaging the latches. At this point the user presses the compaction button on the front panel (zone 1*d'*) and, if all the operational/safety conditions are satisfied, i.e.:

the door 14 is closed;
the flap 15 is closed;
the drawer 11 is fully inserted inside the compactor trolley 1 and the fixed safety contacts 19 and 20 are in contact with each other;
the box 16 is present;
the space inside the box is not used up (signalled on the display present on 1*d'*);
the dividing wall optionally movable between the first and second compaction chambers of the drawer 11 is closed (only in the full-size version);
the electromechanical compaction actuator is operated so that it presses against the rubbish and compacts it.

The user may repeat these operations until the box 16 is full.

Correct and efficient operation of the compactor device may be ensured by means of a control panel (the part indicated as 1*d* and 1*d'* is the front part of the control panel) which interfaces with an electronic section managed by a microprocessor with software. In this way it is possible to manage the various steps for use of the trolley in combination with those of the compactor, by suitably coordinating the compaction functions. Moreover, the control display may show information such as the number of cycles and the operating hours and/or other information useful for operation and maintenance of the compactor.

Control of operation of the compactor trolley may be furthermore improved by means of the use of suitably positioned sensors, which may be, for example, of the microswitch, optical, magnetic or other type. These sensors allow adjustment of activation of the compaction function and ensure operation of the machine in total safety.

Advantageously, operation of the compactor trolley may be assisted by sensors which also provide information about the amount of rubbish which is present inside the waste storage box.

With reference to FIGS. 6-9, a compactor trolley according to the invention may have the general characteristics described hitherto and comprises in particular the first compaction chamber which is closed at the front by the door 14 in which a flap for access to the compaction chamber is formed, the flap 15 being movable between a closed position and an open position, for example by means of rotation about a respective hinging axis which may arranged on a bottom or lateral (vertical) side of the flap 15.

The compactor device comprises a compaction plate 70 arranged above the compaction chamber and designed to move in both senses of the vertical direction Z-Z, between a raised rest position disengaged from the compaction chamber and a lowered position for compaction of the waste, where the plate 70 is arranged in the compaction chamber at a suitable height for compacting the waste which may be present inside a box 16 housed inside said compaction chamber, penetrating inside the box 16 through the associated top opening 16*a*.

The compaction plate 70 has a top surface 70*a* and a bottom surface 70*b* directed towards the compaction chamber and designed to act on the waste for compaction thereof.

The compactor trolley according to the invention comprises a safety locking mechanism 50 for the flap 15 which is arranged inside the trolley and configured to lock mechanically the flap 15 in the closed position, namely fastened to the door 14 and therefore to the trolley structure, when said plate 70 is not in the raised disengaged/rest position.

The safety locking mechanism 50 comprises a first element 51 fixed to the flap 15 and a second, movable, locking element 52 connected to the trolley structure (or if necessary to the door 14). The locking element 52 is movable between a disengagement position (FIGS. 8, 9*a*) disengaged from the first element 51, corresponding to the raised disengaged position of the compaction plate 70, into an engagement position (FIGS. 7, 9*b*) engaged with said first element 51, in which the locking element 52 and the first element 51 fixed to the flap are coupled together so as to lock mechanically the flap 15 in the closed position.

As shown more clearly in FIGS. 7 and 8, the first element comprises preferably a collar 51*a* which defines a seat or hole 51*b*; the collar 51*a* may for example be fixed to the flap 15 by means of suitable lateral fixing flanges 51*c*, for example by means of screws 51*d*.

An axis of the hole 51*b* may be for example vertical Z-Z or transverse Y-Y, in particular depending on the orientation of the opening/closing hinging axis of the flap, preferably orthogonal thereto.

The locking element comprises preferably a sliding pin 52, which has dimensions such that it can be inserted inside the hole 51*b* of the first element 51 so as to cause stable coupling together of pin and hole in said engaged position of pin 52 and hole 51*a*. The pin 52 is in particular arranged so as to slide in both senses of a direction parallel to the axis of the hole 51*a*.

The pin 52 is enclosed inside a housing 55 which defines a guide for the sliding movement of the pin 52.

A thrust spring 58 is preferably arranged so as to push the locking element towards the engagement position (FIGS. 7, 9*b*) where it is engaged with the first element 51. The locking element 52 is therefore normally kept by the spring 58 in the engaged locking position, a pushing action being required in order to overcome the force of the spring 58 and bring the locking element 52 into the disengaged position and thus free the flap 15.

The spring is in particular arranged coaxially around the pin 52 and is designed to act on a head 52a of the pin 52 which has a diameter greater than a shank 52b of the said pin. The spring is instead arranged so as to react against a bearing surface 55a defined by the housing 55.

The locking element preferably comprises an arm 54 integral with the pin 52 and projecting inwards in the longitudinal direction X-X. By operating the arm 54 it is therefore possible to operate the pin in both senses of the sliding direction (e.g. vertical direction Z-Z). Preferably, the arm 54 is movable inside a slot 55c (FIGS. 7, 8) of the housing 55 in both senses of the sliding direction Z-Z of the pin 52 and projects towards the inside of the trolley with respect to the housing 55 itself so that a free end thereof is accessible for operation of the locking element.

Advantageously, the arm 54 may be in the form of a pin which can be coupled by means of screwing together with the pin 52 which may comprise, for this purpose, a hole with a female thread having a longitudinal axis, suitable for stable engagement with a thread of an end part 54a of the arm 54.

Figures 9A, 9B:
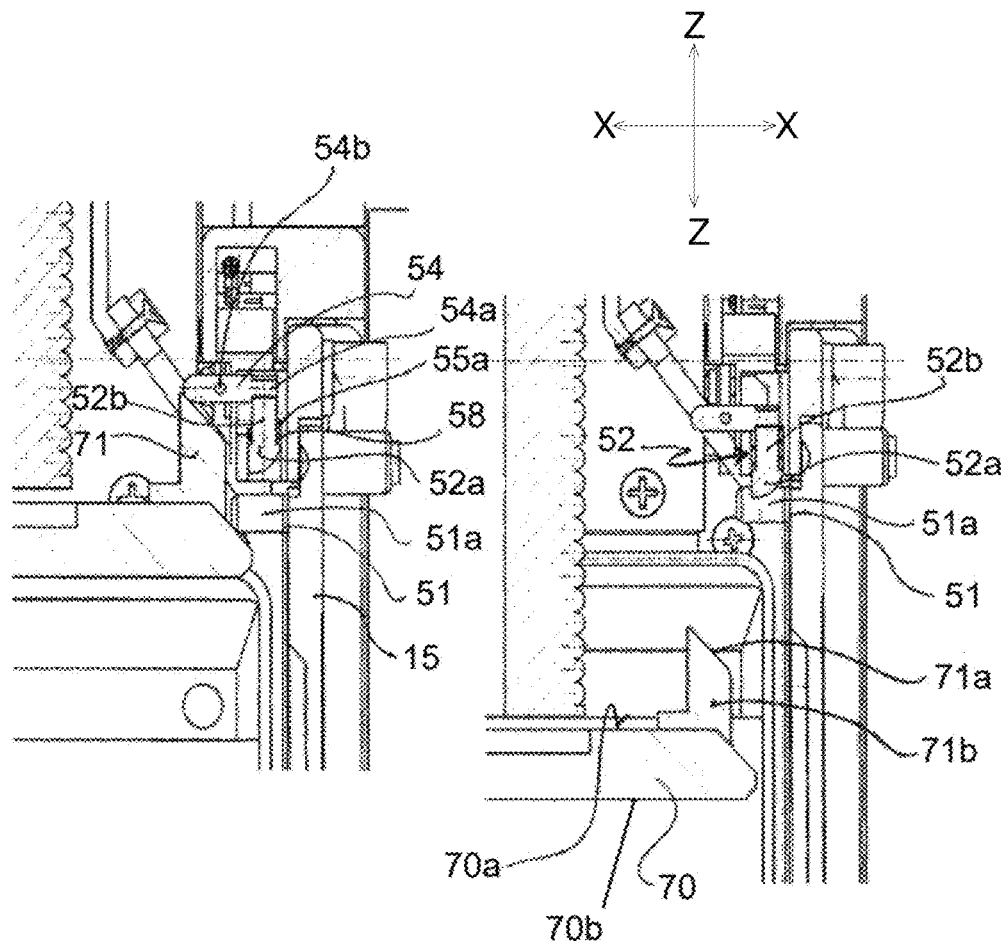
FIG. 9a shows a partial vertically sectioned view of the trolley according to the invention, in the region of the compaction plate and the safety locking system, in the unlocked position.
FIG. 9b shows a partial vertically sectioned view of the trolley according to the invention, in the region of the compaction plate and the safety locking system, in the safety locking position.

Preferably, and as shown in FIGS. 9a, 9b, the arm 54 may comprise a through-hole 54b, orthogonal to its direction of longitudinal extension and designed for the insertion of a tool for facilitating the screwing of the arm 54 onto the movable pin 52.

An actuating block 71 is integral in the vertical direction with the compaction plate and is designed to act mechanically by means of its actuating part 71a on the safety locking mechanism, in particular on the projecting arm 54, so as to cause locking and/or release of the flap 15.

In greater detail, the actuating block 71 preferably comprises an end surface which is designed to act on the locking mechanism, in particular on the arm 54. In particular, the actuating part 71a of the actuating block 71 is in the form of the end surface which is arranged and configured to act mechanically on the locking element of the safety locking mechanism so as to cause the locking and/or release of the flap 15. As shown, the end surface is arranged in an upper position in the vertical direction relative to the compaction plate 70 and is integral therewith in the vertical direction. "Upper position" is understood as meaning a position arranged at a height situated above at least the bottom surface 70b of the plate 70 and preferably the top surface 70a.

In particular, the end surface may form part of a body 71b of the block 71 fixed to the top surface 70a of the compaction plate 70.

By arranging the part of the actuating block 71 which acts on the locking mechanism above the compaction plate 70, the correct operation of the locking mechanism 50 is ensured independently of cleaning of the plate 70 itself; greater safety and reliability as well as a reduction in the need for maintenance are thus achieved.

Advantageously, at least the actuating arm 54 and preferably also the sliding pin 52 and the collar 51 with hole or seat may be arranged at a height in the vertical direction such as to remain always above the height of the plate 70, both in the raised rest position (FIG. 9a) and in the lowered compaction position.

With this preferred configuration the entire locking mechanism remains always free from dirt and therefore reliable, it not being required to perform in-depth cleaning of the compaction plate and of the top part of the chamber in order to avoid blockages due to dirt in the locking mechanism.

Owing to the upper arrangement of the actuating block 71, it is also possible to configure the end surface with an optimum design for operation of the locking mechanism. In particular, the end surface is preferably inclined, preferably from the top downwards and from the inside towards the locking device 50.

The collar 51 formed with through-hole for receiving the pin 52 allows the synergic use of the locking pin 52 as a maintenance element which, whenever inserted, owing to its movement, tends to remove any minimum dirt which has accumulated. With this configuration, the definition of the dimensions of the thrust spring 58 is also simplified, it not being necessary for said spring to be precisely calibrated in order to position the pin in bearing contact.

For maximum reliability and simplicity of manufacture and maintenance it is preferable for the flap 15 to open towards the outside of the trolley.

FIG. 7 also shows a bellows 78 for protecting the means for moving the compaction plate 70 (also called RAM).

With this configuration, the operating principle of a compactor trolley according to the invention is as follows:
- when the compaction plate 70 is in its raised rest position (FIGS. 8, 9a), the actuating block 71 pushes the projecting arm 54 of the locking element, keeping it in the raised end-of-travel position;
- in this position the locking pin 52 is kept in the position disengaged from the seat 51a of the first element 51 and the spring 58 is compressed;
- the flap 15 is therefore free to move in the open or closed position, allowing the on-board operators to throw the rubbish into the box by simply opening the front flap 15 which provides access to the top part of the compaction compartment and therefore the box;
- when the compaction plate 70 is operated downwards inside the compaction chamber, the actuating block 71 moves together with the plate 70 which frees the arm 54 of the locking element 52;
- the action of the spring 58 therefore pushes the pin 52 in the direction of the seat 51 until the pin is engaged inside the seat, thus ensuring safety locking of the flap 15.

Owing to this mechanism, the compactor trolley according to the present invention allows easy access to the compaction chamber for the disposal of rubbish, while avoiding an incorrect and dangerous use (opening) of the flap 15 during a compaction cycle, which could adversely affect the functionality of the system during the compaction cycle where the compaction plate is lowered and the bellows for protecting the part for movement of the compaction plate is exposed. The risk of damage or injury to the operators, who could insert hands or other objects into the compaction chamber during the compaction cycle, is also avoided.

The safety locking mechanism is easy and inexpensive to produce and assemble and, since it is mechanical in nature, it does not require the presence of an electric power supply or sensors for ensuring the safety of the compactor trolley.

The trolley according to the invention is moreover compact, modular, light and efficient from the point of view of electric power consumption. It is also compatible with the existing aviation regulations.

The compactor trolley according to the invention may be made using any material having the necessary strength characteristics. In particular, for use in the aeronautical sector, light metallic alloys, such as aluminium alloys or composite materials with low inflammability and toxicity, known per se, are preferred.

With regard to the above, a preferred embodiment of the invention has been described, although the invention is not limited in any way to the characteristics described. Persons skilled in the art will understand that, in the light of what is disclosed here, modifications and variations may be made without thereby departing from the scope of the present invention as defined by the accompanying claims.

The invention claimed is:

1. A compactor trolley for aeronautical applications having:
   a parallelepiped trolley structure;
   a compactor device positioned in a front upper zone of the compactor trolley;
   a compaction chamber situated underneath the compactor device and configured to house at least one box for collecting waste to be open at a top and along sides thereof;
   a flap disposed at a front of the compaction chamber for access to the compaction chamber, the flap being movable between a closed position and an open position,
   wherein the compactor device comprises a compaction plate designed to move in both senses of a vertical direction between a raised rest position and a lowered position for compaction of the waste inside a box housed inside the compaction chamber;
   a safety locking mechanism for the flap, arranged inside the compactor trolley and configured to lock mechanically the flap in the closed position when the compaction plate is in a position other than the raised rest position,
   wherein the safety locking mechanism comprises a first element fixed to the flap and a locking element connected to the trolley structure or a door thereof and movable between a position disengaged from said first element, corresponding to the raised rest position of the compaction plate, and a position engaged with the first element,
   wherein the locking element and the first element fixed to the flap mechanically lock the flap in the closed position when the compaction plate is not disengaged in the raised rest position,
   wherein the first element comprises a collar which defines a seat or a hole and is fixed to the flap, wherein the locking element comprises a pin sliding for insertion inside the seat or hole of the first element so as to cause a stable coupling together of the pin and seat or hole in the engaged position of the locking element and first element,
   wherein the locking element comprises an arm integral with the pin and projecting towards an inside of the trolley structure, so that by operating the arm the pin is actuated in both senses of a sliding direction; and
   an actuating block integral with the compaction plate a vertical direction and comprising an actuating part designed to act mechanically on the safety locking mechanism so as to cause a locking and/or a release of the flap, said actuating part being arranged at a height in the vertical direction situated above the compaction plate,
   wherein the arm, the pin and the collar are arranged at a height in the vertical direction above the compaction plate in the raised rest position.

2. The compactor trolley according to claim 1, wherein the actuating block is designed to act mechanically on the locking element of the safety locking mechanism in order to cause the locking or the release of the flap.

3. The compactor trolley according to claim 1, wherein the flap is formed in a front opening/closing door of the compaction chamber for insertion/extraction of the box, the flap being movable with respect to the door between the closed position and the open position, by rotation about a respective hinging axis.

4. The compactor trolley according to claim 1, wherein the pin is arranged to slide in both senses of a direction parallel to an axis of the hole or seat.

5. The compactor trolley according to claim 1, further comprising a thrust spring positioned to push the locking element towards a position for engagement with the first element, the spring being arranged coaxially around the pin, and to act on a head of the sliding pin, the head having a diameter greater than a shank of the pin.

6. The compactor trolley according to claim 1, wherein the pin is enclosed in a housing which defines a guide for a sliding movement of the pin, wherein the housing defines a bearing surface against which a thrust spring reacts and/or wherein the arm is movable inside a slot of the housing in both senses of the sliding movement of the pin and projects towards an inside of the trolley with respect to the said housing, so that a free end thereof is accessible for operation of the locking element.

7. The compactor trolley according to claim 1, wherein the arm is shaped as a second pin which can be coupled by screwing together with the pin for stable engagement with a thread of an end part of the arm.

8. The compactor trolley according to claim 1, wherein the arm comprises a through-hole which is orthogonal to a direction of longitudinal extension of the arm and is designed to allow an insertion of a tool for facilitating a screwing of the arm onto the pin.

9. The compactor trolley according to claim 2, wherein said actuating part of the actuating block is shaped as an end surface which is arranged and configured to act mechanically on the locking element of the safety locking mechanism, so as to cause the locking and/or release of the flap.

10. The compactor trolley according to claim 9, wherein the end surface forms part of a body of the actuating block which is fixed to the top surface of the compaction plate.

11. The compactor trolley according to claim 1, wherein the compaction chamber and/or the door is/are formed by a drawer extractable from the parallelepiped trolley structure, and wherein the drawer is provided laterally with at least one side wall which can be opened when the drawer is open and/or at a front with a handle for a partial or total extraction thereof from the parallelepiped trolley structure.

12. The compactor trolley according to claim 1, wherein the flap is hinged at a bottom or along sides inside a corresponding open recess of the door and can be opened towards an inside or towards an outside of the compactor trolley through an opening angle of between 20° and 180°, the flap being moreover provided with safety closing systems situated on an outside of the door and/or safety sensors for enabling compaction.

13. A method of compacting waste in an aeronautical sector by using a compactor trolley having a parallelepiped structure and comprising a compactor device positioned in a front upper zone of the compactor trolley, the method comprising:
   housing a box, which is open at a top and on sides and inside which waste to be compacted is collected, in a compaction chamber of the compactor trolley, in a position situated below a compaction plate of the compaction device;
   closing a flap for access to the compaction chamber;
   operating the compaction plate of the compaction device in a vertical direction from a raised rest position into a lowered position, for compaction of the waste inside the box housed in the compaction chamber; and mechanically locking the flap in the closed position when the compaction plate moves into a position other than the raised rest position, using a safety locking mechanism for the flap, which is arranged inside the compactor trolley and operated by an actuating block in a vertical direction, using an actuating part which acts mechanically on the safety locking mechanism so as to cause a locking and/or release of the flap, said actuating part being arranged at a height in the vertical direction situated above the compaction plate, wherein the safety locking mechanism comprises a first element fixed to the flap and a locking element connected to the trolley structure or a door thereof and movable between a position disengaged from said first element, corresponding to the raised rest position of the compaction plate, and a position engaged with the first element, wherein the locking element and the first element fixed to the flap mechanically lock the flap in the closed position when the compaction plate is not disengaged in the raised rest position, wherein the first element comprises a collar which defines a seat or a hole and is fixed to the flap, wherein the locking element comprises a pin sliding for insertion inside the seat or hole of the first element so as to cause a stable coupling together of the pin and seat or hole in the engaged position of the locking element and first element, wherein the locking element comprises an arm integral with the pin and projecting towards an inside of the trolley structure, so that by operating the arm the pin is actuated in both senses of a sliding direction, and wherein the arm, the pin and the collar are arranged at a height in the vertical direction above the compaction plate in the raised rest position.

* * * * *